US012725274B2

(12) United States Patent
Xu et al.

(10) Patent No.: US 12,725,274 B2
(45) Date of Patent: Sep. 1, 2026

(54) OBJECT REFINEMENT IN DIGITAL IMAGE

(71) Applicant: Rapsodo Pte. Ltd., Singapore (SG)

(72) Inventors: Dejiang Xu, Singapore (SG); Kelvin Soon Keat Yeo, Singapore (SG); Batuhan Okur, Singapore (SG)

(73) Assignee: Rapsodo Pte. Ltd., Singapore (SG)

(*) Notice: Subject to any disclaimer, the term of this patent is extended or adjusted under 35 U.S.C. 154(b) by 234 days.

(21) Appl. No.: 18/753,189

(22) Filed: Jun. 25, 2024

(65) Prior Publication Data

US 2025/0391033 A1 Dec. 25, 2025

(51) Int. Cl.

| | |
|---|---|
| ***G06T 7/13*** | (2017.01) |
| ***G06T 5/20*** | (2006.01) |
| ***G06T 7/136*** | (2017.01) |
| ***G06T 7/194*** | (2017.01) |
| ***G06V 10/25*** | (2022.01) |
| ***G06V 10/75*** | (2022.01) |

(52) U.S. Cl.

CPC ................ *G06T 7/194* (2017.01); *G06T 5/20* (2013.01); *G06T 7/13* (2017.01); *G06T 7/136* (2017.01); *G06V 10/25* (2022.01); *G06V 10/751* (2022.01); *G06V 2201/07* (2022.01)

(58) Field of Classification Search

CPC ........... G06T 7/194; G06T 7/13; G06T 7/136; G06T 7/11; G06T 5/20; G06V 10/25; G06V 10/751; G06V 2201/07

See application file for complete search history.

(56) References Cited

PUBLICATIONS

Gasser et al, Accurate detection of spherical objects in a complex background, 29(23): 37048-37065. (Year: 2021).*

Darwich et al, An Edge Detection Method Based on Local Gradient Estimation: Application to High-Temperature Metallic Droplet Images, 2022, Applied Sciences, 2022, 12, pp. 1-9. (Year: 2022).*

Zou et al, Spherical object recognition based on the number of contour edges extracted by fitting and convex hull processing, 2020, J. Automobile Engineering, 235(5): 1225-1235. (Year: 2020).*

* cited by examiner

*Primary Examiner* — Kathleen M Broughton

(74) *Attorney, Agent, or Firm* — Scully, Scott, Murphy & Presser, P.C.

(57) ABSTRACT

Pixel intensity differences between pixel values of a region in a first image frame and the region in a second image frame are determined, where the region in the first image frame includes an image of a spherical object, with no overlapping spherical object in the second image frame. Based on the pixel intensity differences, the region of the first image frame is thresholded into foreground pixels and background pixels until the background pixels make up more than a predefined percentage of the region of the first image frame. From the background pixels, a subset of the background pixels located along a plurality of paths that radially extend outward from a center of the region in different angular degrees is selected. The subset of the background pixels is filtered by applying a filter, where the filtered subset is detected as edge pixels.

20 Claims, 4 Drawing Sheets

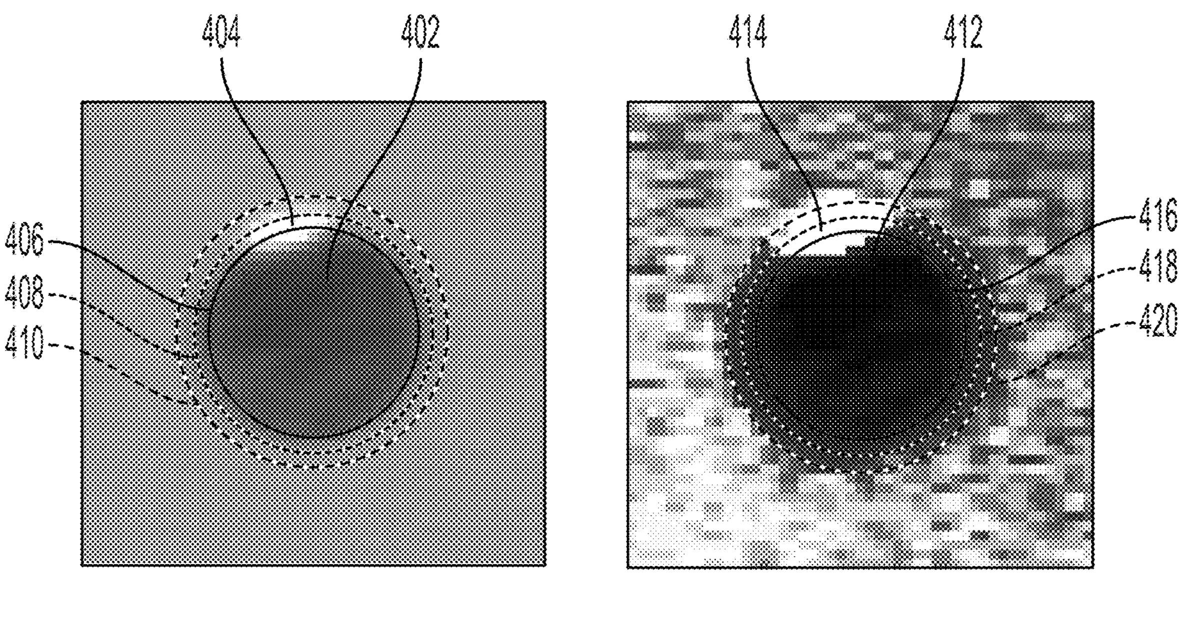
FIG. 4A
FIG. 4B
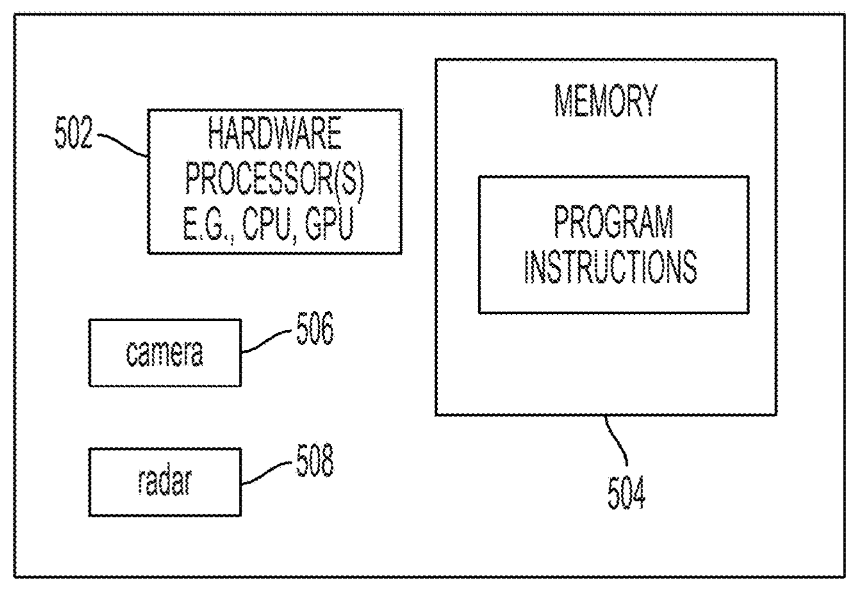
FIG. 5

OBJECT REFINEMENT IN DIGITAL IMAGE

BACKGROUND

The present application relates generally to computers, computer applications, computer vision, image processing, and edge detection, and more particularly to object refinement in images.

Image processing takes images captured using acquisition tools or devices such as cameras and manipulates the images to enhance and/or derive information from the images. In some instances, image processing may also include digitizing images captured in analog form to a digital form prior to manipulating the images. Digital images are represented by pixels (picture elements) of varying intensities. For example, an image can be divided into multiple units of equal sizes, referred to as pixels, and each pixel has an intensity value, a numerical value denoting the pixel's brightness or darkness. By way of example, a grayscale digital image has pixels of varying range of values representing various shades of gray. Color images are represented with different channels, e.g., RGB (red, green, blue) channels, where each color channel corresponds to an independent grayscale image. In digital images, intensity values may range from 0 to 255 that represent different levels of brightness.

Image processing also includes detecting objects in images for various computer vision applications. Edge detecting is one of steps in image processing, which is useful, for example, in recognizing patterns or identifying objects in images. Image processing is widely used, for example, in computer vision, for various applications to obtain meaningful data from visual input, such as in tracking moving objects and/or their trajectories, and other applications such as autonomous driving, disease detection in medical images, and/or others.

BRIEF SUMMARY

The summary of the disclosure is given to aid understanding of a system and method of object refinement in images, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the disclosed system and/or method.

A system, in some embodiments, includes at least one memory device. The system also includes at least one processor coupled with the memory device. The at least one processor is configured to determine pixel intensity differences between pixel values of a region in a first image frame and the region in a second image frame. The region in the first image frame has an image of a spherical object, and the region in the second image frame has no image of the spherical object that overlaps the image of the spherical object appearing in the region in the first image frame. The at least one processor is also configured to threshold, based on the pixel intensity differences, the region in the first image frame into foreground pixels and background pixels until the background pixels make up more than a predefined percentage of the region in the first image frame. The at least one processor is also configured to select from the background pixels, a subset of the background pixels located along a plurality of paths that radially extend outward in different angular degrees from a center of the region in the first frame. The at least one processor is also configured to filter the subset of the background pixels by applying a filter. The at least one processor is also configured to detect the filtered subset of the background pixels as edge pixels defining a boundary of the spherical object.

A computer-implemented method, in some embodiments, includes determining pixel intensity differences between pixel values of a region in a first image frame and the region in a second image frame, where the region in the first image frame has an image of a spherical object, and the region in the second image frame has no image of the spherical object that overlaps the image of the spherical object appearing in the region in the first image frame. The method also includes thresholding, based on the pixel intensity differences, the region in the first image frame into foreground pixels and background pixels until the background pixels make up more than a predefined percentage of the region in the first image frame. The method further includes selecting from the background pixels, a subset of the background pixels located along a plurality of paths that radially extend outward in different angular degrees from a center of the region in the first frame. The method also includes filtering the subset of the background pixels by applying a filter. The method further includes detecting the filtered subset of the background pixels as edge pixels defining a boundary of the spherical object.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 4A and FIG. 4B illustrate examples of images where there are illuminations and/or shades on the objects in some embodiments.

FIG. 5 shows a block diagram of a system in some embodiments that can perform object edge refinement in images described herein.

DETAILED DESCRIPTION

Figure 1:
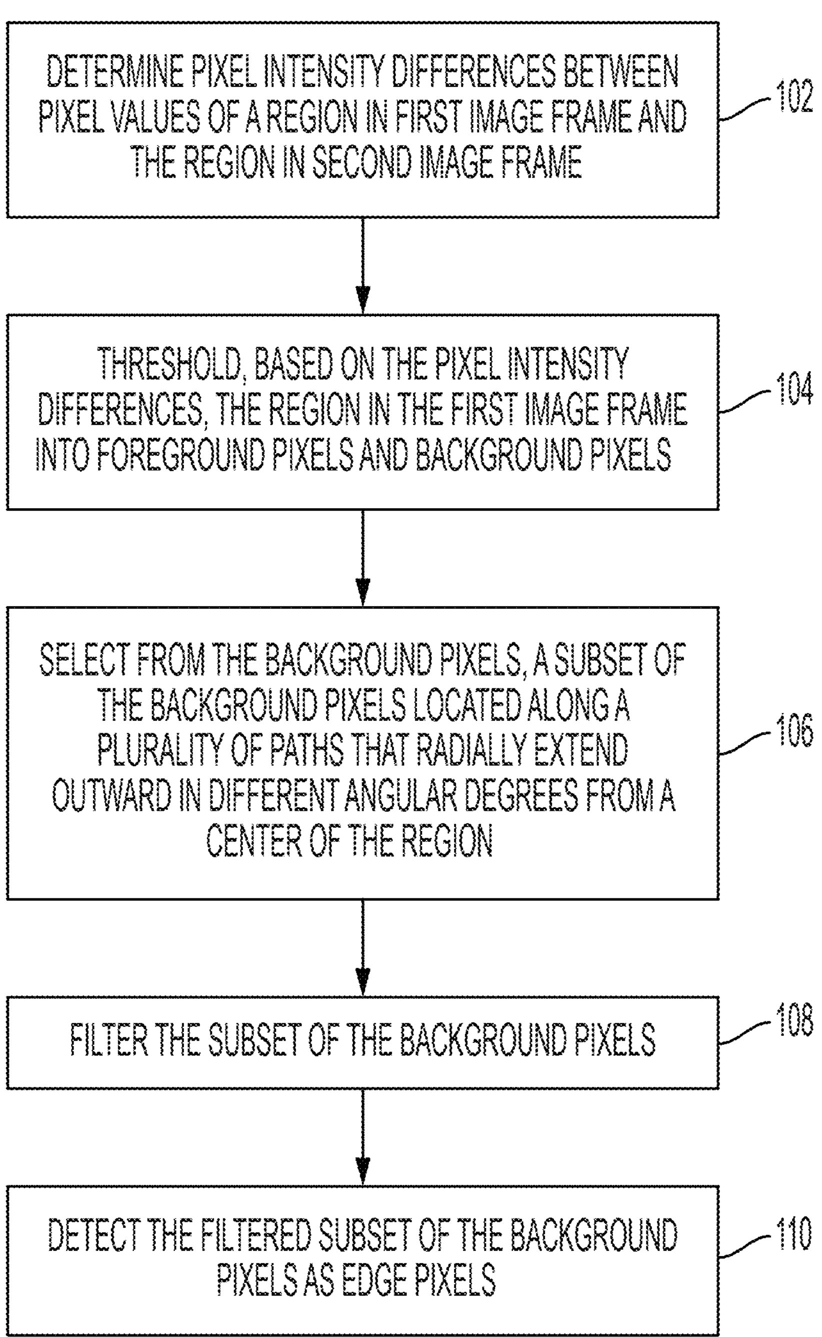
FIG. 1 illustrates a method of refining an object appearing in an image in some embodiments.

FIG. 1 illustrates a method of refining an object appearing in an image in some embodiments. The method finds a boundary of an object in an image. The method is implemented on, or executed by, one or more computer processors. For example, a processor may be a central processing unit (CPU), a graphics processing unit (GPU), a field programmable gate array (FPGA), an application specific integrated circuit (ASIC), another suitable processing component or device, or one or more combinations thereof. Such a processor may be coupled with a memory device. The memory device may include random access memory (RAM), read-only memory (ROM) or another memory device, and may store data and/or processor instructions for implementing various functionalities associated with the methods and/or systems described herein. One or more of the computer processors may execute computer instructions implementing the method, e.g., stored in the memory coupled with one or more of the computer processors, and/or received from another computer device or medium.

In some embodiments, the method performs a refinement of a spherical object detected in an image, for example, finds a boundary of the spherical object using edge validation and edge refinement. The method operates on a given cropped region of an image containing a spherical object such as a ball (e.g., golf ball), e.g., pre-processed by an object finding algorithm. In the following description, a ball is used as an example spherical object in describing the method and system. However, it should be understood that the methodology disclosed herein can work with other spherical objects, not limited to a ball.

In some embodiments, the method comprises measuring center and radius of an object within an image, e.g., within a given cropped region, and employing edge validation and edge refinement techniques. Edge validation separates an edge of the object from all other artifacts appearing in various regions of the image. Such artifacts can be formed by nets, seams, shade, shadow, and/other peripheral object or visual effects cast in the image. Edge refinement locates the object's edge, including parts of the edge, which can be obscured, e.g., due to the object being under shade or shadow or another visual effect. Objects or balls with an illumination problem look smaller than they actually are. By way of example, this phenomenon is shown in FIG. 4A and FIG. 4B. For human vision, human eyes cannot see the edge under the shade and shadow, as the human eyes have minimum level of stimulation for detection, also known as just noticeable difference (JND). For computer vision, the traditional edge detection algorithms such as Sobel, Canny, Prewitt, and others, locate the edge at the points with local maximum gradient (non-maximum suppression). Those edge points are shown in FIG. 4A and FIG. 4B described below. Image enhancement can increase the accuracy, but cannot guarantee that the enhanced edge is correct (some edges can even be missing in the result), as enhancement changes the relation among intensity.

Figure 2B:
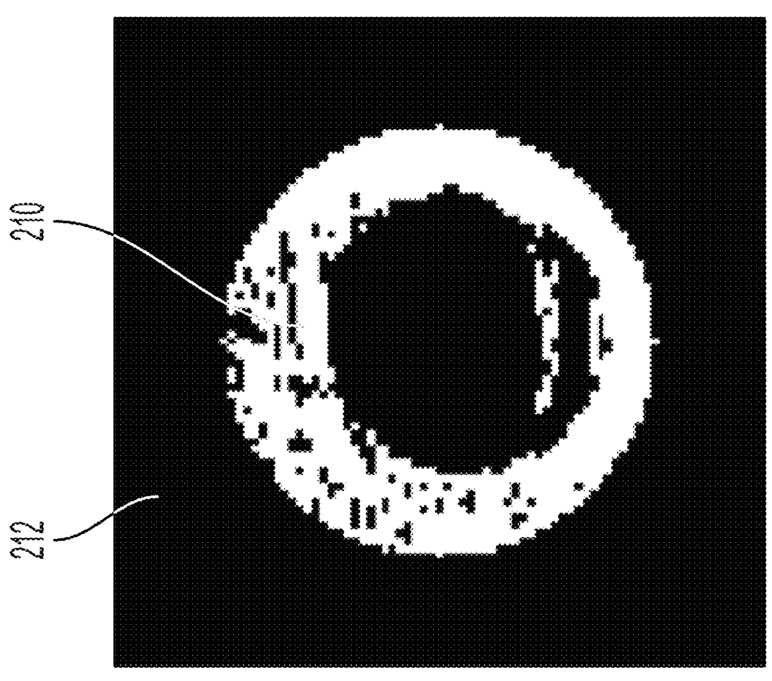
FIG. 2B shows an image illustrating results of thresholding of a difference image in some embodiments.
Figure 2A:
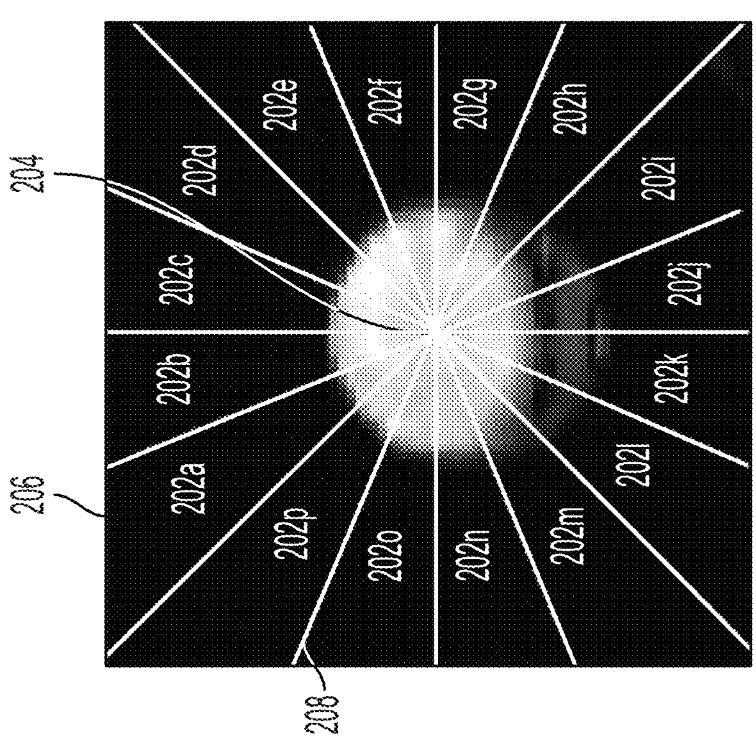
FIG. 2A shows an image of smaller regions for segmentation in some embodiments.

In some embodiments, the method disclosed herein performs edge validation and refinement using region difference of intensity value. For example, since the context of the object (e.g., a ball) is different from background image, the intensity difference between pixels within the object (e.g., ball) region and background pixels is large in magnitude, while the intensity difference is almost zero in the no-object (e.g., no-ball) region (i.e., between the background pixels and pixels of region without the object) (as shown in FIG. 2A). The object (e.g., ball) edge is the boundary of the regions with and without intensity change. The method finds this boundary in some embodiments.

Referring to FIG. 1, at 102, pixel intensity differences are determined between pixel values of a region in a first image frame and the region in a second image frame, where the region in the first image frame has an image of a spherical object, and the region in the second image frame has no image of the spherical object that overlaps the image of the spherical object appearing in the region in the first image frame. For example, the first image frame can be a current image frame or j-th image frame, and the second image frame can be another image frame, for example, (j−5)-th image frame, in a series of image frames that capture the same region.

In some embodiment, the region in the first image frame is a region of interest (ROI), for example, a cropped region of an image frame, where the cropped region includes an image of an object whose edges are being validated and refined. For example, the cropped region or ROI contains a 2-dimensional image of the spherical object (such as a ball, e.g., golf ball, baseball, cricket ball, etc.). Such cropped region can be received from another module or algorithm performed on a computer processor, which has processed the image frame using any one or more known image processing algorithms. The region in the second image frame corresponds to the region in the first image frame, but does not have an image of the object in the area where the object appears in the first image. For example, the first image frame is taken at a point in time where the object is present in the region, and the second image frame is taken at another point in time where there is no object in that region, or where there is no overlapping of the object in the region in the first image frame and the second image frame. The second image frame or a cropped region of the second image frame can also be received, for example, from another module or algorithm performed on a computer processor, which has processed the image frame using one or more image processing algorithms. The method calculates the absolute intensity difference of current ROI to the corresponding region in another image frame. For example, determining pixel intensity differences includes comparing a region of interest (ROI) in the first image frame to the ROI in the second image frame. For instance, for each pixel of pixels representing the region, pixel intensity of the pixel in the second image frame is subtracted from pixel intensity of the corresponding pixel in the first image frame.

Using the pixel intensity differences (which make up a difference image), the method segments out background region. For example, in some embodiments, to remove artifacts such as moving bat, gloves, and/or other artifact in the difference image, the method applies segmentation by performing thresholding. At 104, the method includes thresholding, based on the pixel intensity differences, the region in the first image frame into foreground pixels and background pixels until the background pixels make up more than a predefined percentage of the region in the first image frame.

Thresholding, a technique in digital image processing, separates image pixels into background pixels and foreground pixels. To obtain a desired number of pixels considered to be background pixels or foreground pixels, the method adjusts a threshold parameter T, which control how the separating is to be done. By way of example, from a grayscale image, thresholding can be used to create binary images. For example, thresholding replaces each pixel in an image (e.g., the region of the first image frame) with one of two binary value (e.g., black pixel) if the image intensity of that pixel is less than or equal to the threshold parameter T, or another of the two binary value (e.g., white pixel) if the pixel intensity of the pixel is greater than the threshold parameter T.

In some embodiments, the method applies segmentation (e.g., by thresholding) in smaller regions of the whole region. For example, the method evenly divides the whole region into n number of (e.g., 16) smaller regions. In some embodiments, "n" number of regions are non-overlapped regions. FIG. 2A shows smaller regions obtained from segmentation, in some embodiments. In FIG. 2A, smaller regions 202*a*, 202*b*, 202*c*, 202*d*, 202*c*, 202*f*, 202*g*, 202*h*, 202*i*, 202*j*, 202*k*, 202*l*, 202*m*, 202*n*, 2020, 202*p* are non-overlapping. In some embodiments, in each region, the method may threshold the image until the number of background points are higher than 0.5*area or 50 percent (%), 0.6*area or 60 percent (%), 0.7*area or 70 percent (%), or 0.8*area or 80 percent (%), of the area. For example, the method segments the first image frame into a plurality of segments radiating outwardly from the center 204 of the region 206, where the thresholding thresholds each of the plurality of segments separately in the first image frame.

In some other embodiments, thresholding or segmentation is performed along each of a radial line (radius) of the region. FIG. 2A shows an example of a radial line at 208. FIG. 2B shows results of thresholding performed at 104 in FIG. 1. The points or pixels shown at 210 are segmented as background pixels. The points or pixels shown at 212 are segmented as foreground pixels.

Figure 3A:
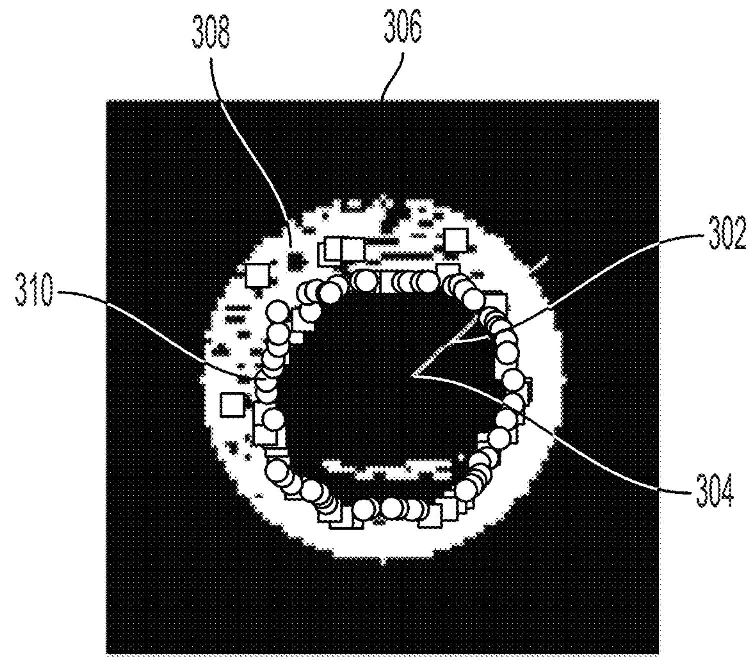
FIG. 3A shows segmented difference image into background and foreground pixels, an example line extending outward from the center of the region and some candidate edge points in some embodiments.

Referring back to FIG. 1, at 106, the method includes selecting from the background pixels (e.g., as shown at 210 in FIG. 2), a subset of the background pixels located along a plurality of paths that radially extend outward from a center of the region in different angular degrees. For example, the method selects all the background points along the lines from center to outward. FIG. 3A shows segmented difference image into background and foreground pixels, an example line extending outward from the center of the region and some candidate edge points in some embodiments. An example straight line, from along whose path background pixels can be selected, is shown at 302. There can be multiples of these lines extending across from the center 304 of the region 306 to different points in the perimeters of the region (or outer circumference or perimeter of the background pixels 308), thus in different angular degrees from the center 304. The number of such lines or paths are configurable, or given by a user, and may vary, for example based on desired processing time and/or computer resources. For example, the less the number of pixels or points there are to process, the less the amount of computer resources used and faster the processing of defining a boundary. Background pixels or points along a path of each of these plurality of lines (e.g., 302) are selected for processing.

There may be some false positive edge points, e.g., when the ball region is similar to background. Those false positive points are either located far from or near to the center 304. In some embodiments, the method also removes such and other false positive edge points. For example, referring back to FIG. 1, at 108, the method filters the subset of the background pixels by applying a filter. In some embodiments, applying of the filter includes dividing the subset of the background pixels into angular sections, sorting the subset of the background pixels in each of the angular sections based on a distance from the center of the region, and selecting a middle predefined percent of a sorted subset of the background pixels from each of the angular section as the edge pixels.

For example, in some embodiments, to remove false positive edge points, the method divides all the candidate points (e.g., the subset of the background pixels selected at 106 in FIG. 1) into 6 sections (not shown) according to their angles (e.g., radial angle from the center). In this example, each section has an angular degree of 60 (or 60° (degrees)) in a pie shape (considering total of 360 degrees in a circle or region). In each section, the method sorts all the points according to their distance to the center and selects middle 60% points from 10% to 70% as the edge points. FIG. 3A at 310 shows these selected middle 60% points (shown as circles over the image) to fit a circle or circular shape. In some embodiments, the method may divide all the candidate points into equal sections. The number of sections is configurable.

Figure 3B:
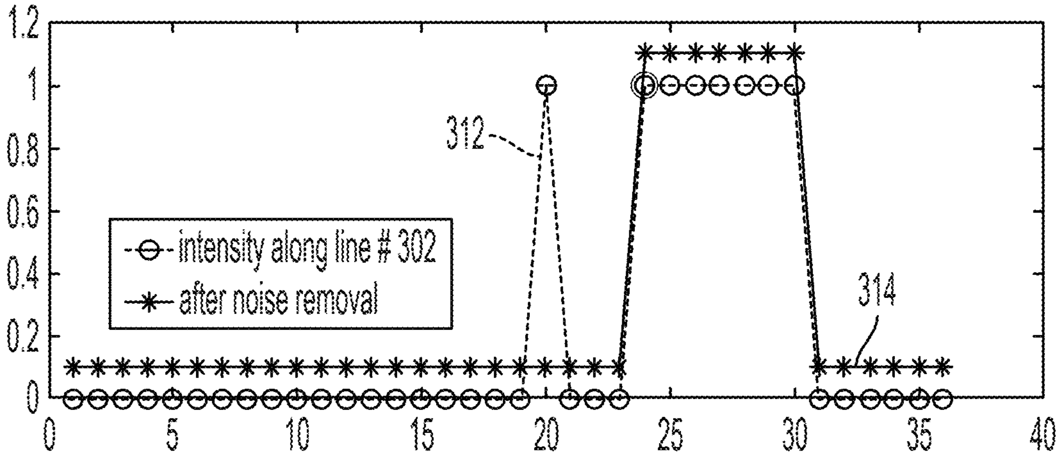
FIG. 3B is a plot diagram showing results of removing false positive edge points in some embodiments.

FIG. 3B is a plot showing results of removing false positive edge points in some embodiments. In the plot, the x-axis represents the distance from the center (304 in FIG. 3A) and y-axis represents the absolute difference in pixel intensity of the current ROI in current frame (first image frame) and the corresponding region in another frame (second image frame). The circle shown at graph 312 represents intensity of pixels (e.g., of the difference image) along a straight line, e.g., 302 in FIG. 3A, before noise removal. As shown in FIG. 3A, line 302 starts from the center 304 of the object, where the intensity of the pixels for example is 255 as the shading is the darkest. The line 302 traverses towards the outer edge and approaches a square where the intensity of the pixels of the square is different, which is shown as a spike at a distance range of 19-21 in FIG. 3B. Thereafter, as the line traverses further outwardly from the center 304 of the object, the intensity of the pixels changes, in the example shown in FIG. 3A, where the intensity of the pixels for example is 0 as the shading is white. Finally, the line 302 traverses towards the darkest region. The asterisk shown at graph 314 represents intensity of pixels after noise removal per FIG. 1 at 108. As shown, removing false positive edge points (e.g., as done at 108 in FIG. 1) results in a more uniform line, which in turn translates into a more accurate object (e.g., ball) edge refinement. That is, the asterisk in graph 314, edge points are defined as those in the distance range of about 23-31 units (e.g., pixels) from the center, while in the circles 312 there are multiple edge points at 19-21 and 23-31 units from the center.

Referring back to FIG. 1, at 110, the filtered subset of the background pixels are detected as or designated as edge pixels defining a boundary of the spherical object. For example, the circle or sphere fitted by pixel points shown at 310 as seen in FIG. 3A are determined or detected as being the edge pixels of the spherical object such as a ball, which define the boundary of that spherical object.

Experimental results of the method disclosed herein show that the method overperforms existing methods in refining object edges such as ball edges in digital images. For example, the method identified edges that are three pixels larger from the center than existing methods. Further, in the experiments, average timing of processing an image was 0.45 millisecond per image.

As described above, FIG. 2A shows smaller regions for segmentation, in some embodiments. In some embodiments, each of the smaller regions are thresholded separately, for example, until background pixels in a respective smaller region make up a desired portion of that respective smaller region.

In some embodiments, thresholding can be applied to pixels in radial lines only. For example, in FIG. 2A, the bottom half of the ball has a different in contrast (white, grey and black). As there are different contrasts in the ball, the algorithm will identify the edges based on the contrast level. By thresholding the radial lines to a value, for example 250, the algorithm may better identify the edge of the ball. The algorithm can divide the number of radial lines to be any number, 16 is an example; another example can be to divide the number of radial lines to be 360.

FIG. 2B shows results of thresholding of a difference image, in some embodiments. The pixel intensity differences obtained based on comparing the region in the first image frame and the second image frame (which form the difference image) are segmented into background and foreground pixels as shown in FIG. 2B.

FIG. 4A and FIG. 4B illustrate examples of images where there are illuminations and/or shades on the objects, in some embodiments. By way of example, in FIG. 4A, an image of a ball 402 with shade or illuminations 404 looks smaller (shown with candidate boundary at 406 based on existing method) than it actually could be (shown with candidate boundaries at 408 and 410). Similarly, in FIG. 4B, the enhanced version of the image shown in FIG. 4A, an image of a ball 412 with shade or illuminations 414 looks smaller (shown with candidate boundary at 416 based on existing method) than it actually could be (shown with candidate boundaries at 418 and 420. For instance, the radii of the ball are different as shown at 406, 408 and 410, and also at 416, 418 and 420. Both the method disclosed herein and existing methods identified the same center for the ball 402, 412 in the images. However, advantageously, the method disclosed herein identified the boundaries at 408, 410 for the ball 402, and 418, 420 for the ball 412, respectively while an existing method identified 406 and 416 as boundaries.

With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer storage medium or media include one or more storage devices that collectively include machine readable code corresponding to instructions and/or data for performing computer operations specified in a given computer storage medium claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include, but are not limited to: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 5 shows a block diagram of a system in some embodiments that can perform object edge refinement in images described herein. One or more hardware processors

502 such as a central processing unit (CPU), a graphic process unit (GPU), and/or a Field Programmable Gate Array (FPGA), an application specific integrated circuit (ASIC), and/or another processor, may be coupled with a memory device 1004, and perform club recognition, for example, using a deep learning model. The memory device 1004 may include random access memory (RAM), read-only memory (ROM) or another memory device, and may store data and/or processor instructions for implementing various functionalities associated with the methods and/or systems described herein.

One or more hardware processors 502 may execute computer instructions stored in memory device 504 or received from another computer device or medium. The memory device 504 may, for example, store instructions and/or data for functioning of one or more hardware processors 502, and may include an operating system and other program of instructions and/or data. As described above in more detail, one or more hardware processors 502 is/are configured to determine pixel intensity differences between pixel values of a region in a first image frame and the region in a second image frame, where the region in the first image frame has an image of a spherical object, and the region in the second image frame has no image of the spherical object that overlaps the image of the spherical object appearing in the region in the first image frame. One or more hardware processors 502 is/are also configured to threshold, based on the pixel intensity differences, the region in the first image frame into foreground pixels and background pixels until the background pixels make up more than a predefined percentage of the region in the first image frame. One or more hardware processors 502 is/are also configured to select from the background pixels, a subset of the background pixels located along a plurality of paths that radially extend outward in different angular degrees from a center of the region in the first frame. One or more hardware processors 502 is/are further configured to filter the subset of the background pixels by applying a filter. One or more hardware processors 502 is/are also configured to detect the filtered subset of the background pixels as edge pixels defining a boundary of the spherical object.

The components of the system may be part of a device such as, but not limited to, a mobile launch monitor (MLM), which is configured to track trajectories of an object such as a moving object in some embodiments. The system may also include one or more cameras 506 for capturing images. In some embodiments, the system may also include one or more radars 508 for detecting motion of one or more objects. A device such as an MLM captures images or video of user in action with respect to an object such as a ball, for example, a user swinging a golf club to launch a golf ball, a user such as a baseball pitcher throwing a baseball, a baseball batter batting a baseball, and/or others. Such devices process images and identify objects in the images. Using the method described herein, the devices may refine boundaries (or edges) of the objects detected in the images including the object in motion such as ball. Accurately defining object boundaries allows for more accurately assessing information conveyed in the images for meaningful and effective usage in applications.

In another aspect, one or more hardware processors 502 and memory 504 may be components of a computer system in computing environment that may include other devices such as, but not limited to, processing circuitry and cache, communication fabric, volatile memory, persistent storage, peripheral devices such as user interface (UI) device, network module that may communicate to remotely located computers, and/or others.

The method described herein can be useful in many computer vision applications such as detecting and/or tracking objects in captured images or video frames, such as tracking trajectories of a moving object via a series of image frames captured as a video over time. For example, the method described herein may be used in a device such as a mobile launch monitor (MLM) described above, as well as in other devices implementing computer vision technique.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in some embodiments" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:

at least one memory device; and at least one processor coupled with the at least one memory device, the at least one processor configured to:

determine pixel intensity differences between pixel values of a region in a first image frame and the region in a second image frame, the region in the first image frame having an image of a spherical object, and the region in the second image frame having no image of the spherical object that overlaps the image of the spherical object appearing in the region in the first image frame;

threshold, based on the pixel intensity differences, the region in the first image frame into foreground pixels and background pixels until the background pixels make up more than a predefined percentage of the region in the first image frame;

select from the background pixels, a subset of the background pixels located along a plurality of paths that radially extend outward in different angular degrees from a center of the region in the first frame;

filter the subset of the background pixels by applying a filter; and detect the filtered subset of the background pixels as edge pixels defining a boundary of the spherical object.

2. The system of claim 1, wherein the at least one processor is configured to compare a region of interest (ROI) in the first image frame to the ROI in the second image frame to determine the pixel intensity differences.

3. The system of claim 2, wherein the ROI in the first image frame contains a 2-dimensional image of the spherical object.

4. The system of claim 1, wherein the predefined percentage is sixty percent.

5. The system of claim 1, wherein the at least one processor is further configured to segment the first image frame into a plurality of segments radiating outwardly from the center of the region, wherein the at least one processor is configured to threshold each of the plurality of segments separately in the first image frame.

6. The system of claim 5, wherein the at least one processor is configured to segment the region evenly into a plurality of non-overlapped regions.

7. The system of claim 1, wherein the at least one processor is configured to apply the filter by dividing the subset of the background pixels into angular sections, sorting the subset of the background pixels in each of the angular sections based on a distance from the center of the region, and selecting a middle predefined percent of a sorted subset of the background pixels from each of the angular section as the edge pixels.

8. The system of claim 7, wherein the middle predefined percent is 60 percent from 10 percent to 70 percent of the sorted subset of the background pixels.

9. A computer-implemented method comprising:

determining pixel intensity differences between pixel values of a region in a first image frame and the region in a second image frame, the region in the first image frame having an image of a spherical object, and the region in the second image frame having no image of the spherical object that overlaps the image of the spherical object appearing in the region in the first image frame;

thresholding, based on the pixel intensity differences, the region in the first image frame into foreground pixels and background pixels until the background pixels make up more than a predefined percentage of the region in the first image frame;

selecting from the background pixels, a subset of the background pixels located along a plurality of paths that radially extend outward in different angular degrees from a center of the region in the first frame;

filtering the subset of the background pixels by applying a filter; and detecting the filtered subset of the background pixels as edge pixels defining a boundary of the spherical object.

10. The computer-implemented method of claim 9, wherein the determining pixel intensity differences includes comparing a region of interest (ROI) in the first image frame to the ROI in the second image frame.

11. The computer-implemented method of claim 10, wherein the ROI in the first image frame contains a 2-dimensional image of the spherical object.

12. The computer-implemented method of claim 9, wherein the predefined percentage is sixty percent.

13. The computer-implemented method of claim 9, further including segmenting the first image frame into a plurality of segments radiating outwardly from the center of the region, wherein the thresholding thresholds each of the plurality of segments separately in the first image frame.

14. The computer-implemented method of claim 13, wherein the segmenting divides the region evenly into a plurality of non-overlapped regions.

15. The computer-implemented method of claim 9, wherein the applying of the filter includes, dividing the subset of the background pixels into angular sections, sorting the subset of the background pixels in each of the angular sections based on a distance from the center of the region, and selecting a middle predefined percent of a sorted subset of the background pixels from each of the angular section as the edge pixels.

16. The computer-implemented method of claim 15, wherein the middle predefined percent is 60 percent from 10 percent to 70 percent of the sorted subset of the background pixels.

17. A computer readable storage medium storing a program of instructions executable by a machine to perform a method of:

determining pixel intensity differences between pixel values of a region in a first image frame and the region in a second image frame, the region in the first image frame having an image of a spherical object, and the region in the second image frame having no image of the spherical object that overlaps the image of the spherical object appearing in the region in the first image frame;

thresholding, based on the pixel intensity differences, the region in the first image frame into foreground pixels and background pixels until the background pixels make up more than a predefined percentage of the region in the first image frame;

selecting from the background pixels, a subset of the background pixels located along a plurality of paths that radially extend outward in different angular degrees from a center of the region in the first image frame;

filtering the subset of the background pixels by applying a filter; and detecting the filtered subset of the background pixels as edge pixels defining a boundary of the spherical object.

18. The computer readable storage medium of claim 17, wherein the predefined percentage is sixty percent.

19. The computer readable storage medium of claim 17, further including segmenting the first image frame into a plurality of segments radiating outwardly from the center of the region, wherein the thresholding thresholds each of the plurality of segments separately in the first image frame.

20. The computer readable storage medium of claim 17, wherein the applying of the filter includes, dividing the subset of the background pixels into angular sections, sorting the subset of the background pixels in each of the angular sections based on a distance from the center of the region, and selecting a middle predefined percent of a sorted subset of the background pixels from each of the angular section as the edge pixels.

* * * * *